C. VAN DE MARK.
Portable Fence.
No. 1,006. Reissued July 10, 1860.
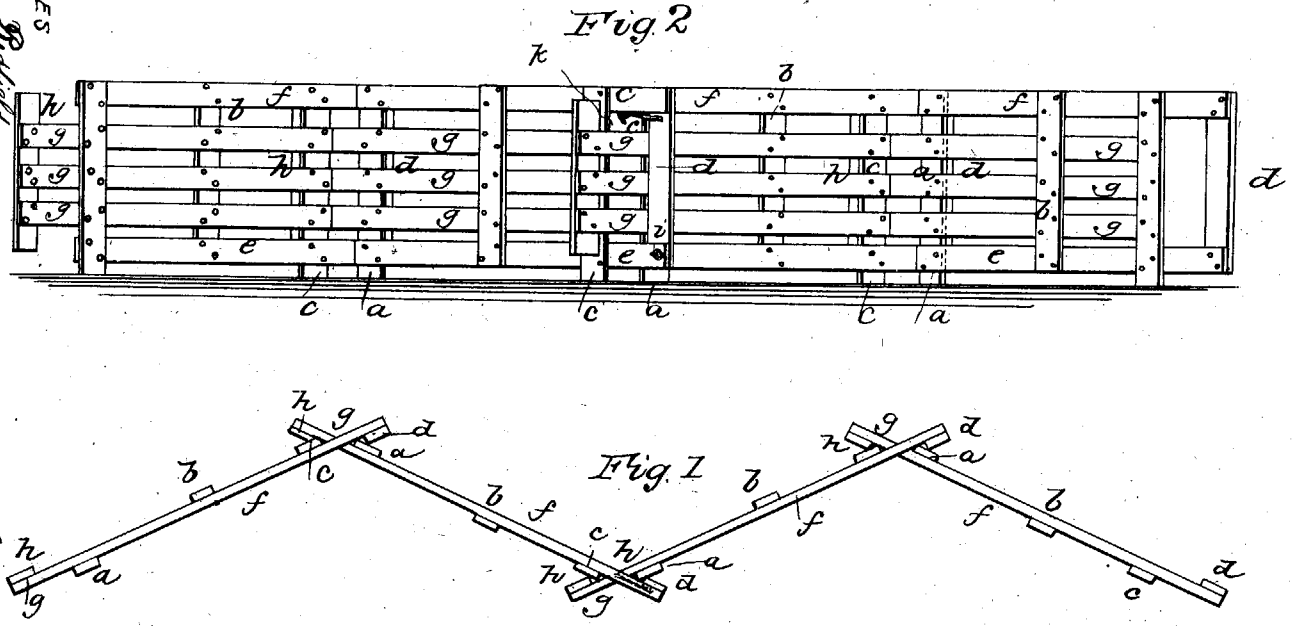
WITNESSES
Lysander Redfield
William Henry
INVENTOR
Charles Van De Mark
N. PETERS. Photo-Lithographer, Washington, D. C.

UNITED STATES PATENT OFFICE.

CHARLES VAN DE MARK, OF OAK'S CORNERS, NEW YORK.

IMPROVED METHOD OF UNITING THE PANELS OF PORTABLE FENCES.

Specification forming part of Letters Patent No. 17,459, dated June 2, 1857; Reissue No. 1,006 dated July 10, 1860.

*To all whom it may concern:*

Be it known that I, CHARLES VAN DE MARK, of Oaks Corners, in the county of Ontario and State of New York, have invented a new and Improved Portable Field-Fence; and I do hereby declare that the following is a full and exact description thereof, reference being had to the accompanying drawings, making part of this specification—

Figure 1 being a plan of a portion of a fence constructed in my improved manner, and arranged in zigzag form; Fig. 2, a side elevation of the same.

Like letters designate corresponding parts in both of the figures.

The fence is made in panels or sections, and all the panels may have the same construction, the general features of which I will here describe. Each panel or section is composed of any desirable number of rails *e f g g*, and of any suitable dimensions, and these rails are connected by a suitable number of upright battens or posts, *a b c*, nailed or otherwise secured to the rails. The battens may be of any dimensions and project beyond the rails or not, at the top or bottom, as desired. They should best be in any case of nearly uniform length, so as to sustain the panels at uniform heights.

The essential feature of my invention consists in providing the ends of the panels respectively with what may be called "hooks" and "eyes"—that is, forming or providing one end of a panel with such an opening or aperture as to serve as an "eye," which may receive the adjacent end of the next panel, formed or provided with such a projection as to serve as a "hook," to enter the eye, and thus hold the panels securely together. There may be various equivalents of the method of forming and arranging these hooks and eyes; but it will be sufficient to describe the method exhibited in the drawings, that being also the best and simplest, all things considered, with which I am acquainted.

In this construction the rails of each panel are all of equal length, but the top and bottom rails, *e f*, project at one end of the panel a few inches beyond the middle rails, *g g*, which consequently project to the same extent beyond the top and bottom rails at the other end of the panel, substantially as represented. At the end where the top and bottom rails project a cross batten or strip, *d*, is nailed to their extreme ends, as shown, thus forming an eye. At the other end another cross batten or strip, *h*, is nailed to the extremities of the middle rails and projects somewhat above and below them, as shown, thus forming a hook, which, on being inserted into the eye described, will overlap the top and bottom rails, as the panels rest on the ground, and prevent one panel being drawn out of the other except by an obvious manipulation.

To form a zigzag fence the hooks are inserted into the eyes in the manner shown in the drawings, the width of the eyes being such as to give any required degree of the zigzag position, more or less; and the panels are drawn endwise, or toward a straight position, until they are firmly bound and locked together. In thus uniting the panels it is best to have the battens *a d* on opposite sides of their panels, as also the battens *c h*, so that each pair mentioned may come into contact with each other, as represented, and bind the panels together, and at the same time strengthen the construction of the panels themselves. This arrangement of the battens, however, is not essential to the invention. All or any of the battens may be put on either side of the panels.

To form a straight fence with the panels, the hooks are so inserted into the eyes that the hook-battens *h h* shall be side by side and in contact with the eye-battens *d d*, the panels being drawn lengthwise till that portion is obtained. When straight fence is made, stakes, braces, or other supports are employed to keep the panels upright and firm. Zigzag fence requires nothing of the sort, the position of the panels holding the fence up very firmly.

When the fence is to be laid in a circular or curved form, the panels are connected in the same way as in the zigzag form, except that instead of having the panels turn or point alternately to the right and left they turn continually either to the right or to the left.

In making corners, or a square fence, or in crossing two fences at right angles, the hooks and eyes interlock with the same facility, convenience, and firmness. Also, for making triangular fence, or for inclosing grounds of any angular shape, the panels are connected with equal convenience and efficacy. The fence may also crook irregularly with the same result. The panels are likewise as readily laid on uneven ground as on level or plane ground.

It is obvious that the modes of forming these hooks and eyes may be greatly varied without changing their essential features and functions. Thus, for instance, in making the eyes, it is not necessary that only the top and bottom rails should project. Any others or any number of them may project which will produce the eye substantially; the same is true of the hooks; or there may be more than one eye on the end of a panel, and more than one hook. But one of each is the simplest and generally the best; and it is not necessary that these hooks and eyes should be formed by the projections of the rails. They may be formed by separate pieces, but the projecting rails furnish the simplest, cheapest, and strongest mode of which I am aware. Instead of providing each panel with a hook and eye, one panel may have a hook at each end, and the next panel have an eye at each end, and so on. Thus, it is seen how many variations may be made without in the least changing the character of the invention.

What I claim as my invention, and desire to secure by Letters Patent, is—

Forming or providing the ends of the panels or sections of a fence with hooks and eyes, substantially as herein specified, to receive each other respectively in succession, and thereby to sustain and lock the said panels or sections together, in the manner and for the purposes set forth.

CHARLES VAN DE MARK.

Witnesses:
J. S. BROWN,
EDM. F. BROWN.